United States Patent
Chen et al.

(10) Patent No.: US 10,451,963 B2
(45) Date of Patent: Oct. 22, 2019

(54) PROJECTION SCREEN HOLDING FRAME ASSEMBLY

(71) Applicant: Innovision Flextech Corporation, Kaohsiung (TW)

(72) Inventors: Ming-Li Chen, Kaohsiung (TW);
Tsung-Jung Tsai, Kaohsiung (TW);
Cheng-Jung Su, Kaohsiung (TW);
Bo-Jhou Lin, Kaohsiung (TW)

(73) Assignee: Innovision Flextech Corporation, Kaohsiung (TW)

( * ) Notice: Subject to any disclaimer, the term of this patent is extended or adjusted under 35 U.S.C. 154(b) by 0 days.

(21) Appl. No.: 15/988,246

(22) Filed: May 24, 2018

(65) Prior Publication Data
US 2019/0227422 A1 Jul. 25, 2019

(30) Foreign Application Priority Data
Jan. 19, 2018 (TW) ............... 107101969 A

(51) Int. Cl.
*G03B 21/56* (2006.01)
*F16M 13/02* (2006.01)

(52) U.S. Cl.
CPC ............. *G03B 21/56* (2013.01); *F16M 13/02* (2013.01)

(58) Field of Classification Search
CPC .................................................. G03B 21/56
USPC ......................................................... 359/443
See application file for complete search history.

(56) References Cited

U.S. PATENT DOCUMENTS

| | | | | |
|---|---|---|---|---|
| 3,485,165 A | * | 12/1969 | Hughes | B07B 1/48 101/127.1 |
| 3,583,466 A | * | 6/1971 | Dreyer | G03B 21/58 160/351 |
| 5,467,546 A | * | 11/1995 | Kovalak, Jr. | G09F 15/0025 160/378 |
| 6,785,047 B1 | * | 8/2004 | Risher | G03B 21/58 359/443 |
| 7,936,505 B2 | * | 5/2011 | Enochs | G03B 21/56 359/443 |
| 9,110,362 B2 | * | 8/2015 | Risher | G03B 21/56 |

(Continued)

FOREIGN PATENT DOCUMENTS

CN 1825924 A 8/2006
CN 105791727 A 7/2016

*Primary Examiner* — Christopher E Mahoney
(74) *Attorney, Agent, or Firm* — Thomas J. Nikolai; DeWitt LLP

(57) ABSTRACT

A holding frame assembly has a main frame, an outer frame, a gap, and multiple elastic members. The main frame is rectangular in shape and has two lateral main frame rods, two longitudinal main frame rods, four L-shaped connection elements, and multiple main frame securing fasteners. The L-shaped connection elements are disposed respectively at four connected portions of the lateral main frame rods and the longitudinal main frame rods to connect the main frame rods together by the main frame securing fasteners. The outer frame is mounted around the main frame by multiple outer frame fasteners and is composed of two lateral outer frame rods and two longitudinal outer frame rods. The gap is defined between the outer frame and the main frame. The elastic members are disposed between the main frame and the outer frame and are connected with the main frame.

19 Claims, 19 Drawing Sheets

(56) References Cited

U.S. PATENT DOCUMENTS

2010/0027112 A1\* 2/2010 Kijima .................. G03B 21/56
359/443

\* cited by examiner

PROJECTION SCREEN HOLDING FRAME ASSEMBLY

BACKGROUND OF THE INVENTION

1. Field of the Invention

The present invention relates to a projection screen holding frame assembly, and more particularly to a combination projection screen holding frame assembly.

2. Description of Related Art

To project videos with a projector, a projection screen is widely applied to show the videos. The projection screen is made of a soft material, so the projection screen has to be expanded to be a flat surface by a holding frame for use.

A conventional projection screen holding frame has a size corresponding to a size of the projection screen. However, the rim of the conventional projection screen holding frame around the projection screen is thick, so the conventional holding frame has a large size for transportation and storage. In addition, a holding frame in a large size is easily deformed due to the gravity, so the projection screen disposed on a deformed holding frame is not smooth and flat.

To prevent the deformation of the conventional holding frame, the conventional holding frame in a large size is usually made of a material having a high structural strength, such that the appearance of the conventional holding frame is not aesthetic.

In addition, the conventional holding frame is substantially composed of two lateral frame rods and two longitudinal frame rods connected with the two lateral frame rods. Each frame rod has two inclined ends at 45° angle. Multiple L-shaped connection elements are mounted between the frame rods to connect the frame rods with each other by fasteners. However, the combination portions between the frame rods may have gaps when the inclined ends of the frame rods are not formed at a correct angle. Furthermore, sharp corners will be formed at the conventional holding frame, which may injure a user.

To overcome the shortcomings, the present invention tends to provide a projection screen holding frame assembly to mitigate or obviate the aforementioned problems.

SUMMARY OF THE INVENTION

The main objective of the invention is to provide a projection screen holding frame assembly that has a slim frame and aesthetically-appealing appearance.

The holding frame assembly has a main frame, an outer frame, a gap, and multiple elastic members. The main frame is rectangular in shape and has two lateral main frame rods, two longitudinal main frame rods, four L-shaped connection elements, and multiple main frame securing fasteners. The longitudinal main frame rods are connected with the two lateral frame rods to hold a projection screen on the main frame in an expansion state. The L-shaped connection elements are disposed respectively at four connected portions of the two lateral main frame rods and the two longitudinal main frame rods to connect the two lateral main frame rods and the two longitudinal main frame rods. The main frame securing fasteners are connected securely with the L-shaped connection elements, the two lateral main frame rods, and the two longitudinal main frame rods. The outer frame is mounted around the main frame by multiple outer frame fasteners and is composed of two lateral outer frame rods and two longitudinal outer frame rods. The two lateral outer frame rods are fixed respectively to the two lateral frame rods and outer surfaces of corresponding two of the L-shaped connection elements. The two longitudinal outer frame rods are fixed respectively to the two longitudinal main frame rods and outer surfaces of corresponding two of the L-shaped connection elements. The gap is defined between the outer frame and the main frame to allow the screen to pass through the gap. The elastic members are disposed between the main frame and the outer frame and are connected with the main frame to connect with a periphery of the screen.

Other objects, advantages and novel features of the invention will become more apparent from the following detailed description when taken in conjunction with the accompanying drawings.

DETAILED DESCRIPTION OF PREFERRED EMBODIMENT

Figure 1:
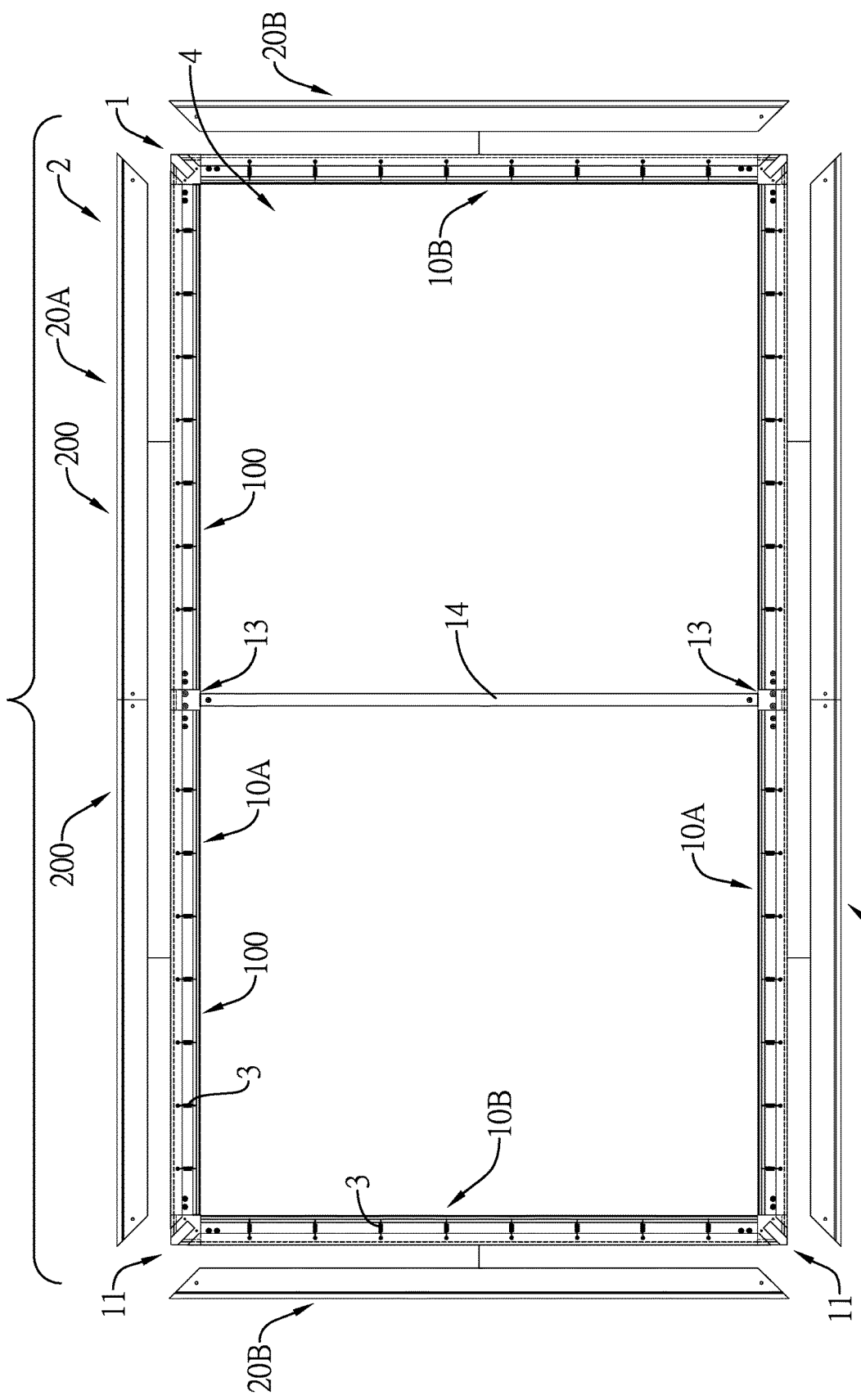
FIG. 1 is an exploded rear view of a first embodiment of a projection screen holding frame assembly in accordance with the present invention.
Figure 2:
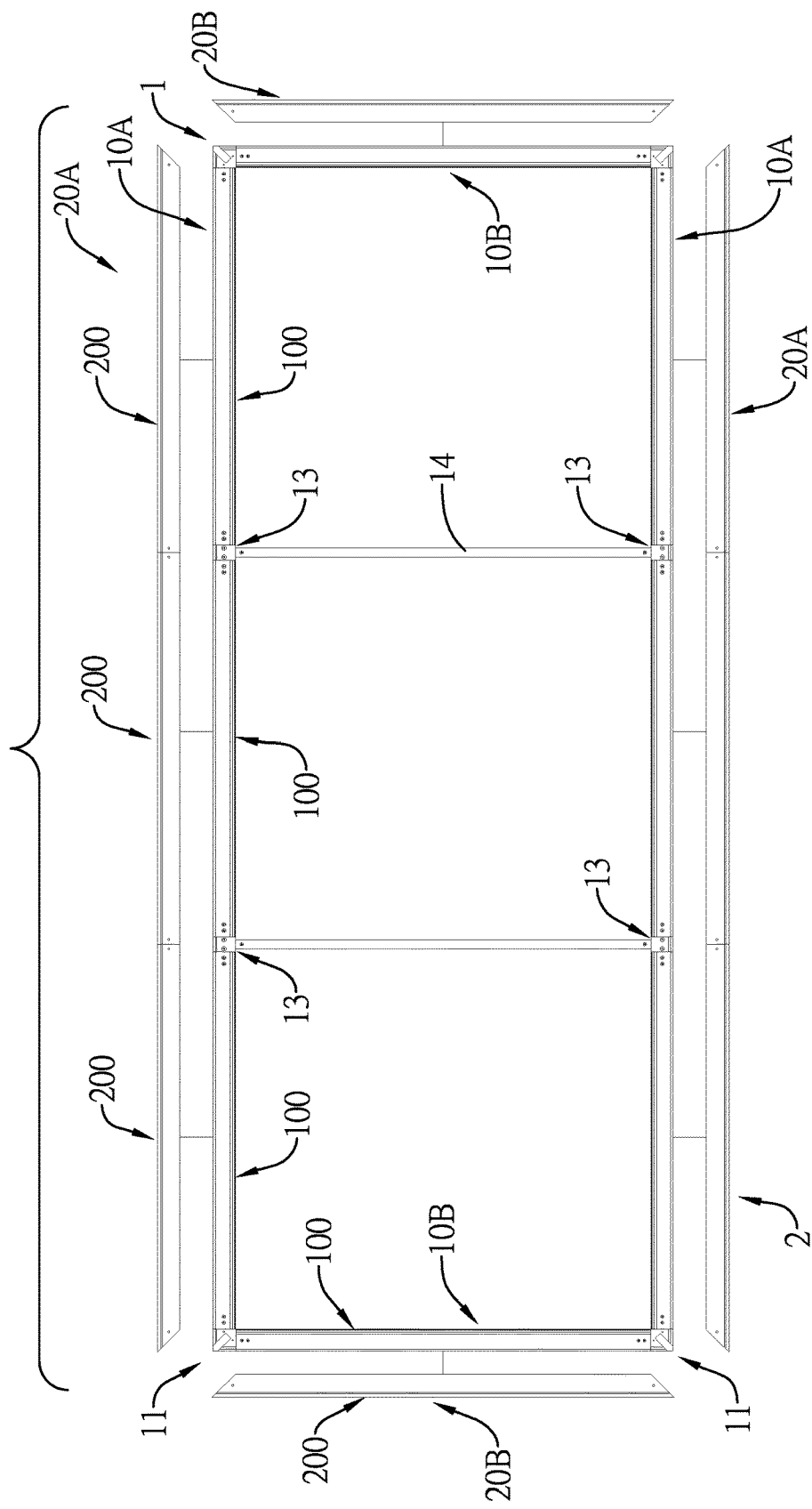
FIG. 2 is an exploded rear view of a second embodiment of a projection screen holding frame assembly in accordance with the present invention.

With reference to FIGS. 1 and 2, a projection screen holding frame assembly in accordance with the present invention comprises a main frame 1, an outer frame 2, and multiple elastic members 3.

Figure 3:
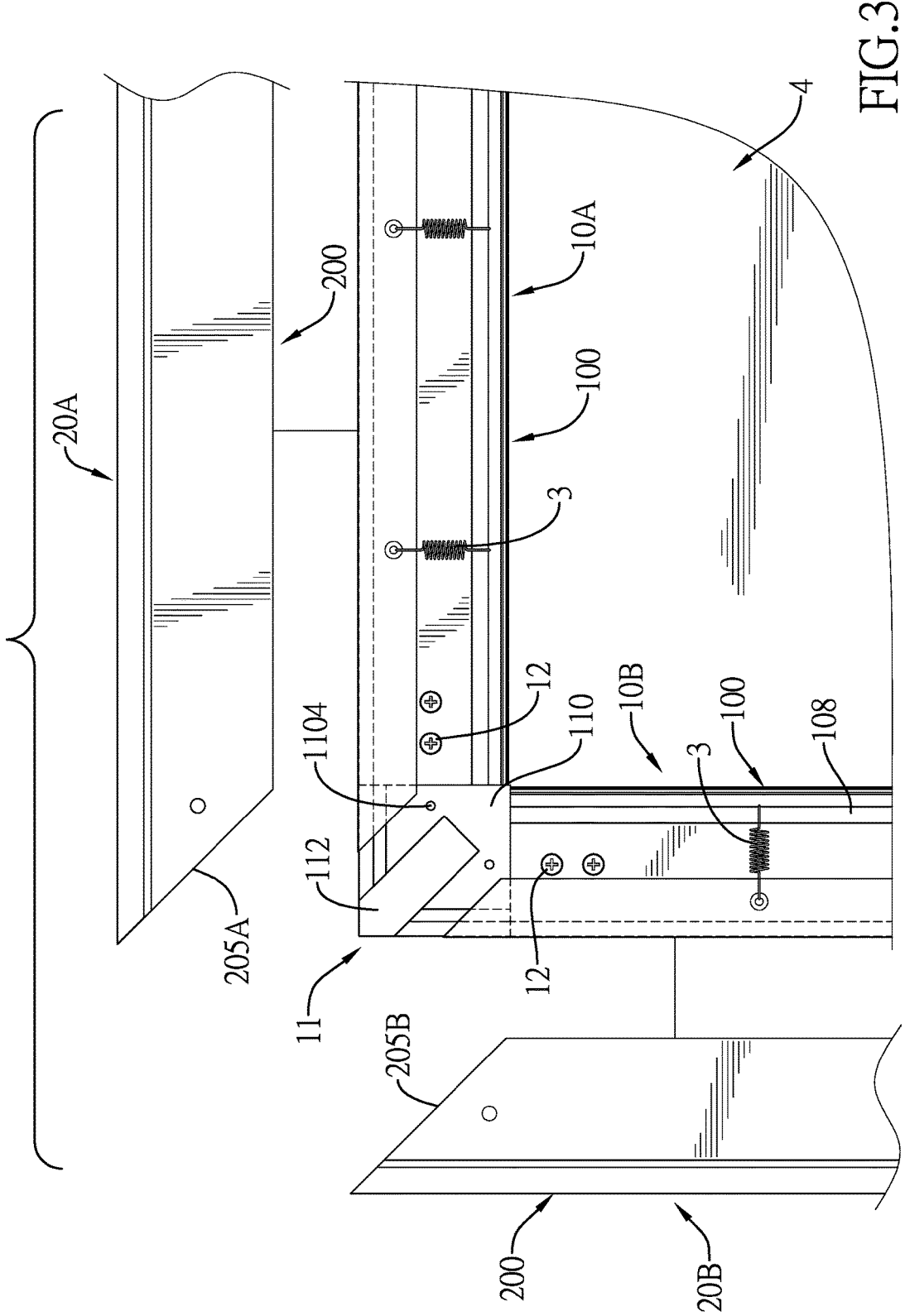
FIG. 3 is an enlarged exploded rear view of the holding frame assembly in FIG. 1.
Figure 4:
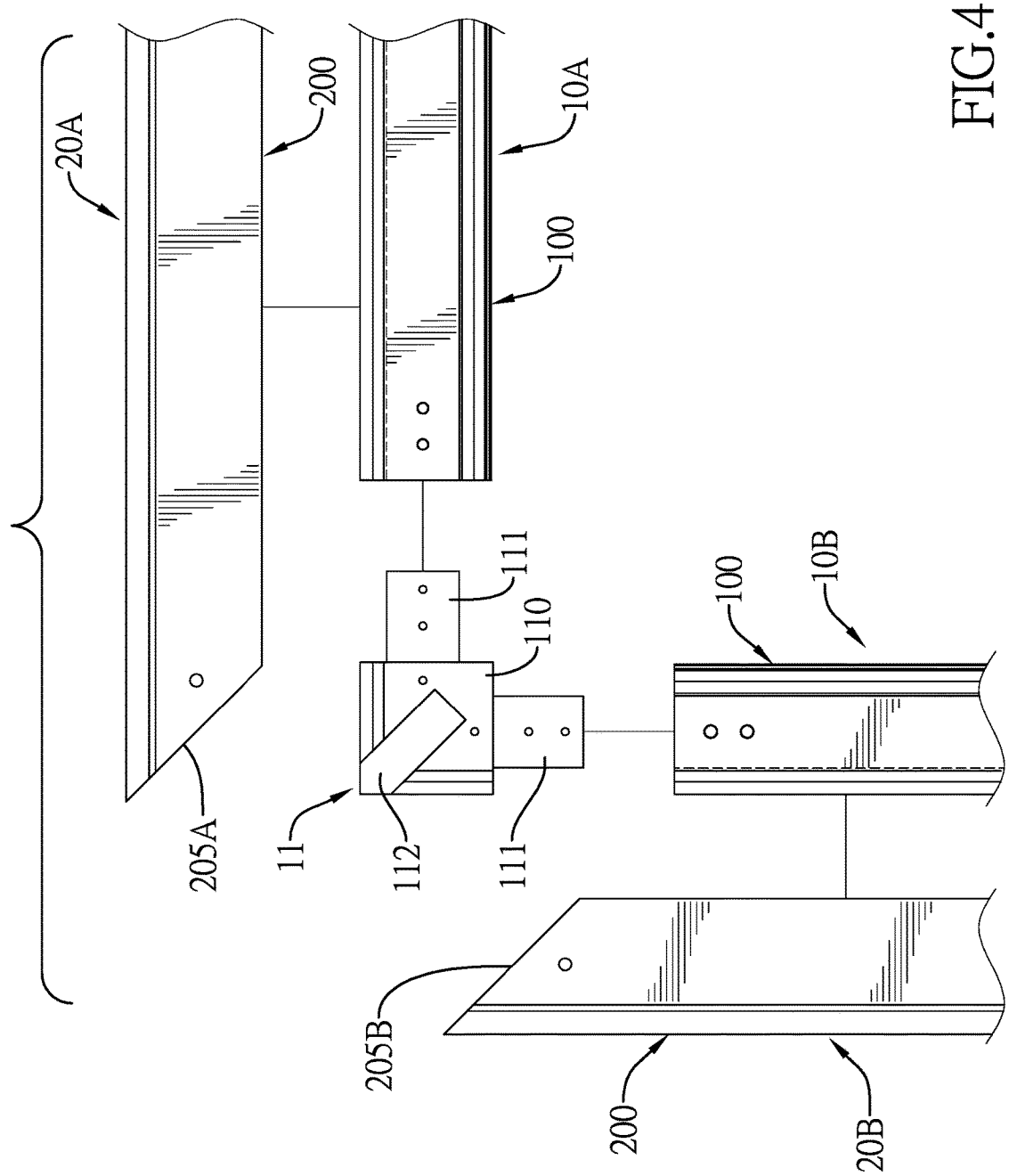
FIG. 4 is another enlarged exploded rear view of the holding frame assembly in FIG. 1.
Figure 5:
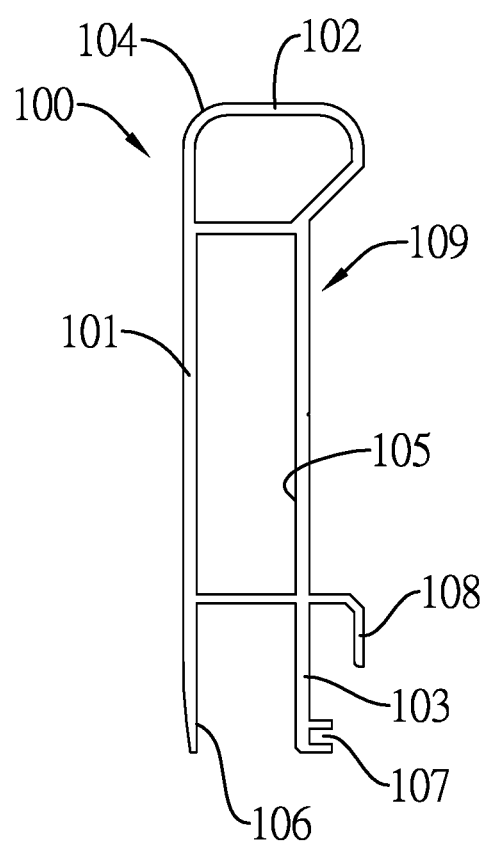
FIG. 5 is an enlarged end view of a main frame rod of the holding frame assembly in FIG. 1.

With reference to FIGS. 1, 3, and 4, the main frame 1 comprises two lateral main frame rods 10A, two longitudinal main frame rods 10B, four L-shaped connection elements 11, and multiple main frame securing fasteners 12. The two lateral main frame rods 10A are parallel with each other, and the two longitudinal main frame rods 10B are connected with ends of the two lateral main frame rods 10A. The L-shaped connection elements 11 are disposed respectively at four connected portions of the two lateral main frame rods 10A and the two longitudinal main frame rods 10B to connect the two lateral main frame rods 10A and the two longitudinal main frame rods 10B with the multiple main frame securing fasteners 12 and to form the rectangular main frame 1.

With reference to FIGS. 1 and 2, one or two of the two lateral main frame rods 10A and the two longitudinal main frame rods 10B are composed of a single main rod element or multiple main rod elements connected with each other by at least one connecting member based on the length of each main frame rod 10A, 10B. Each one of the two lateral main frame rods 10A and the two longitudinal main frame rods 10B comprises at least one main rod element 100 having a same cross sectional shape. With reference to FIGS. 1 and 3 to 5, each main rod element 100 comprises a main rod body 101, an outer side edge 102, and an inner side edge 103. The inner side edge 103 and the outer side edge 102 are formed respectively at two sides of the main rod body 101. The outer side edge 102 is curved in shape to support an edge of a projection screen 4. A connection hole 105 is defined in the main rod body 101. An opening 106 is defined in the inner side edge 103.

Preferably, the outer side edge 102 protrudes from a rear side of the main rod body 101. A connection groove 107 is defined in the rear side of the main rod body 101 at a position adjacent to the inner side edge 103 to connect with the outer frame 2. A connecting hook 108 is formed on the rear side of the main rod body 101 at a position being adjacent to the inner side edge 103. A holding space 109 is defined in the rear side of the main rod body 101 between the outer side edge 102 and the connecting hook 108 to hold one of the elastic members 3 inside.

Figure 6:
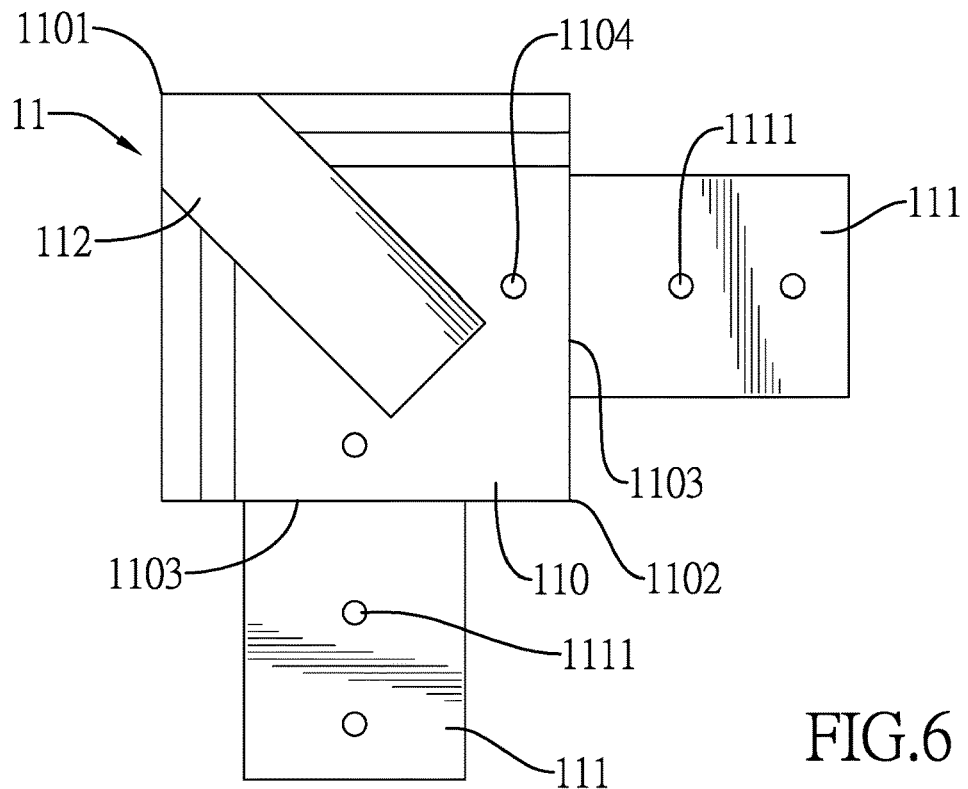
FIG. 6 is an enlarged rear view of an L-shaped connection element of the holding frame assembly in FIG. 1.
Figure 7:
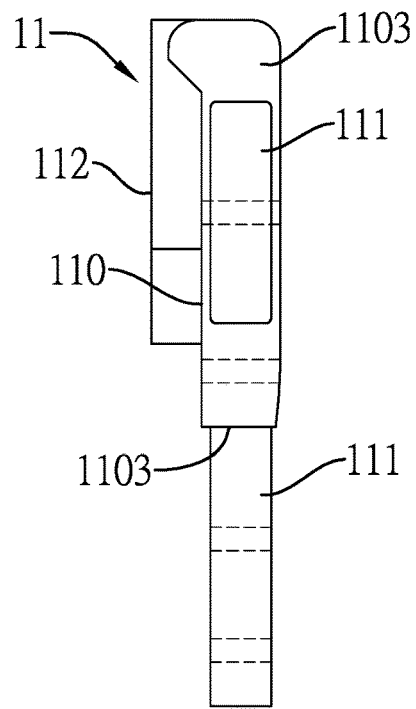
FIG. 7 is a side view of the L-shaped connection element in FIG. 6.

With reference to FIGS. 4, 6, and 7, each L-shaped connection element 11 comprises a base segment 110, two connection arms 111, and a supporting segment 112. The base segment 110 is square in shape and has a front side, a rear side, an inner corner 1102, and an outer corner 1101. The inner corner 1102 and the outer corner 1101 are defined respectively at two ends of a diagonal line of the base segment 110. The connection arms 111 are connected respectively with two side edges 1103 of the base segment 110 adjacent to the inner corner 1102 and has a cross section corresponding to the cross section of the connection holes 105 of the main rod elements 100 of two of the main frame rods 10A, 10B. Each connection arm 111 has at least one threaded hole 1111. The supporting segment 112 is formed on and protrudes from the rear side of the base segment 110 and extends from the outer corner 1101 toward the inner corner 1102 of the base segment 110. Two threaded holes 1104 are defined in the rear side of the base segment 110 respectively at two sides of the supporting segment 112.

Figure 8:
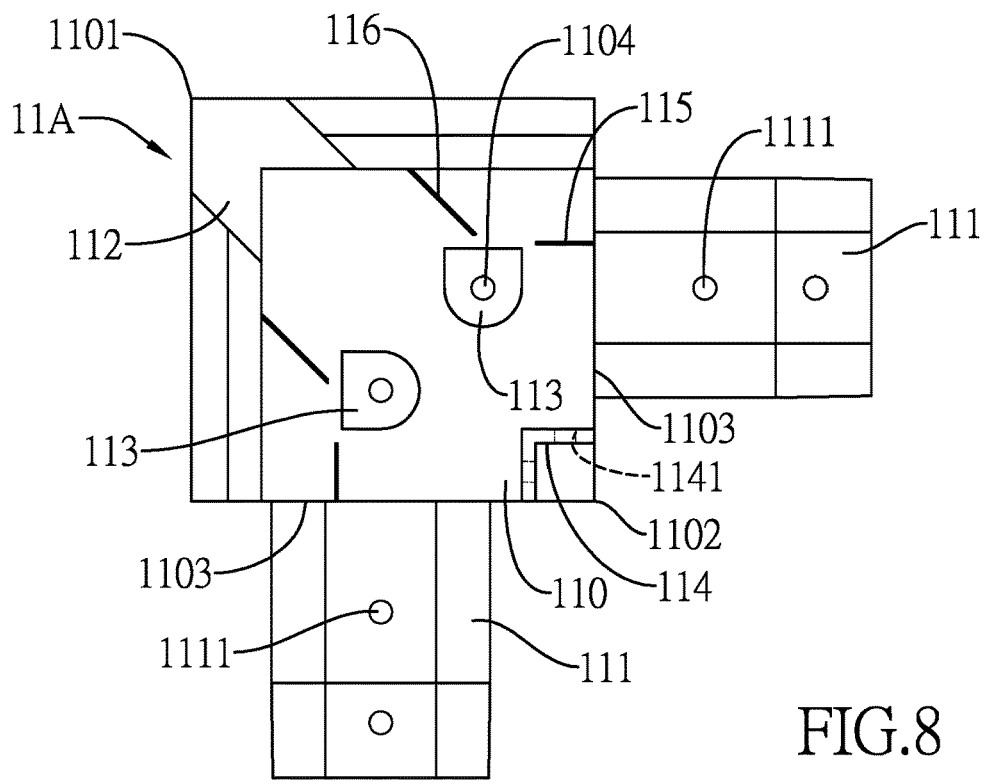
FIG. 8 is an enlarged rear view of another embodiment of an L-shaped connection element of the holding frame assembly in FIG. 1.
Figure 9:
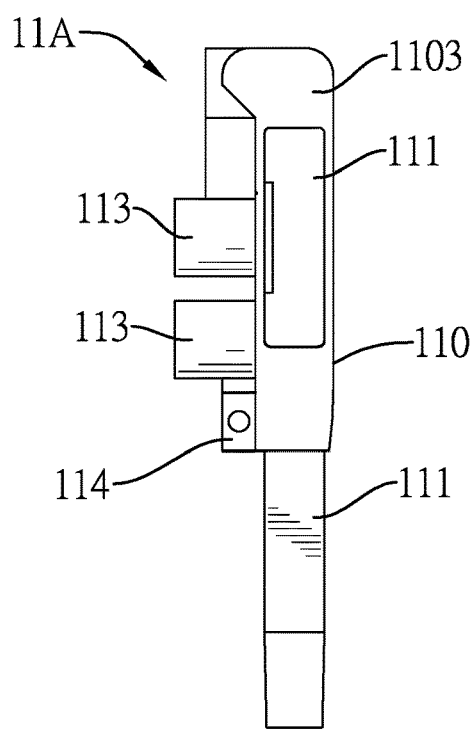
FIG. 9 is a side view of the L-shaped connection element in FIG. 8.
Figure 10:
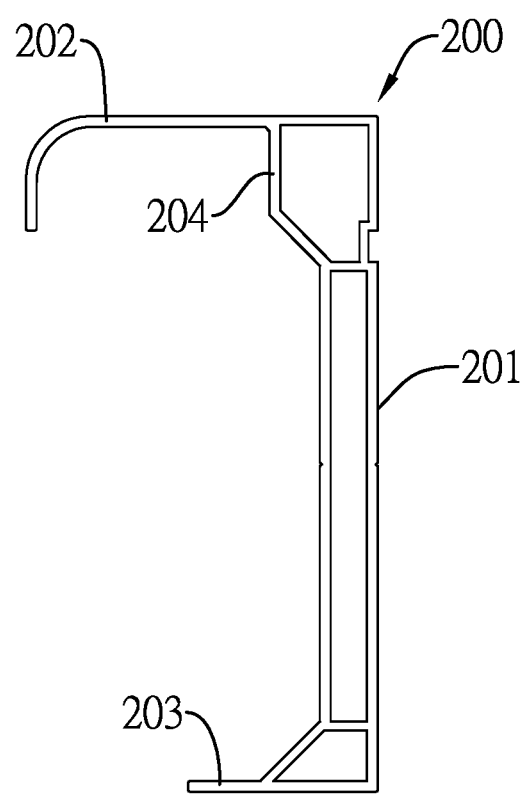
FIG. 10 is an enlarged end view of an outer frame rod of the holding frame assembly in FIG. 1.

With reference to FIGS. 8 and 9, two abutment protrusions 113 are formed on the rear side of the base segment 110, and the threaded holes 1104 are defined respectively in the two abutment portions 113. The base segment 110 further has an alignment line 115 and an inclined line 116 formed on the rear side of the base segment 110 respectively adjacent to the side edges 1103. The alignment line 115 is perpendicular to a corresponding side edge 1103 of the base segment 110. The inclined line 116 is inclined at an angle of 45° relative to a corresponding side edge 1103 of the base segment 110. A spring mount 114 is formed on the rear side of the base segment 110 and has two spring holes 1141.

With reference to FIGS. 4, 6, and 7, each L-shaped connection element 11 is mounted between adjacent lateral main frame rod 10A and the longitudinal main frame rod 10B. The connection arms 111 of each L-shaped connection element 11 are inserted respectively into the connection holes 105 of the corresponding main rod bodies 101. The main frame securing fasteners 12 are mounted through the main rod bodies 101 of the lateral main frame rods 10A and the longitudinal main frame rods 10B and are screwed with the threaded holes 1111 of the L-shaped connection elements 11 to connect the lateral main frame rods 10A and the longitudinal main frame rods 10B together by the L-shaped connection elements 11.

With reference to FIGS. 1, 4, 10, and 11, the outer frame 2 is mounted securely around the main frame 1 by multiple outer frame fasteners 21 and comprises two lateral outer frame rods 20A and two longitudinal outer frame rods 20B. The lateral outer frame rods 20A are parallel with each other and are combined respectively with the lateral main frame rods 10A. The longitudinal outer frame rods 20B are connected with ends of the lateral outer frame rods 20A and are combined respectively with the longitudinal main frame rods 10B. Each outer frame rod 20A, 20B has two ends 205A. 205B each having an inclined end edge at 45° of angle. Each end 205A of each lateral outer frame rod 20A is connected with a corresponding end 205B of a corresponding longitudinal outer frame rod 20B to form a right corner on the outer frame 2.

With reference to FIGS. 1, 4, and 10 to 12, each outer frame rod 20A, 20B is composed of one or multiple outer rod elements 200 having the same cross section in shape. Each outer rod element 200 comprises an outer rod body 201, a decorative board 202, and a connection board 203. The outer rod body 201 has a front side, a rear side, and two side edges. The decorative board 202 and the connection board 203 are formed respectively on the outer rod body 201 and protrude from the front side of the outer rod body 201. The decorative board 202 has a curved front end opposite the outer rod body 201. An abutment segment 204 is formed on and protrudes from the front side of the outer rod body 201 at a position adjacent to the decorative board 202. The connection board 203 is inserted into the connection groove 107 in a corresponding main frame rod 10A, 10B. The supporting segments 112 of the L-shaped connection elements 11 abut the ends of the outer frame rods 20A, 20B to form a gap 206 between the decorative board 202 and the outer side edge 102 and to allow the projection screen 4 to pass through the gap 206.

Figure 14:
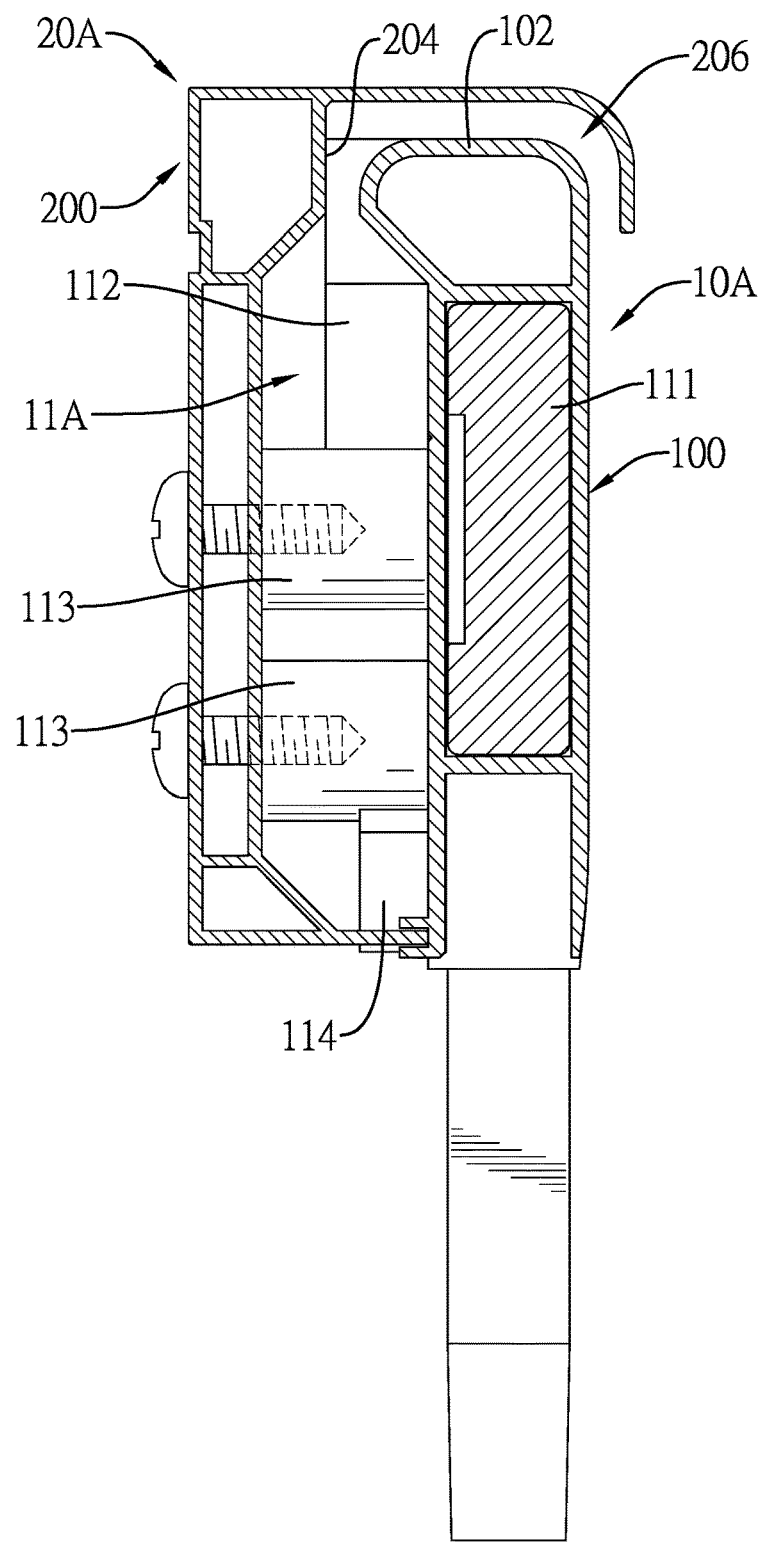
FIG. 14 is an enlarged side view in partial section of the holding frame assembly with the L-shaped connection element in FIG. 8.

With reference to FIGS. 8, 9, and 14, in another embodiment of the L-shaped connection element 11A, the two abutment portions 113 abut respectively on ends of corresponding outer frame rods 20A, 20B. The outer frame fasteners 21 mounted through the outer frame rods 20A, 20B are screwed with the threaded holes 1104 in the abutment protrusions 113. When a side edge of the projection screen 4 extends to the rear sides of the L-shaped connection elements 11A, the alignment lines 115 and the inclined lines 116 on the L-shaped connection elements 11A can be applied to align the side edges on the corners of the projection screen 4.

Figure 13:
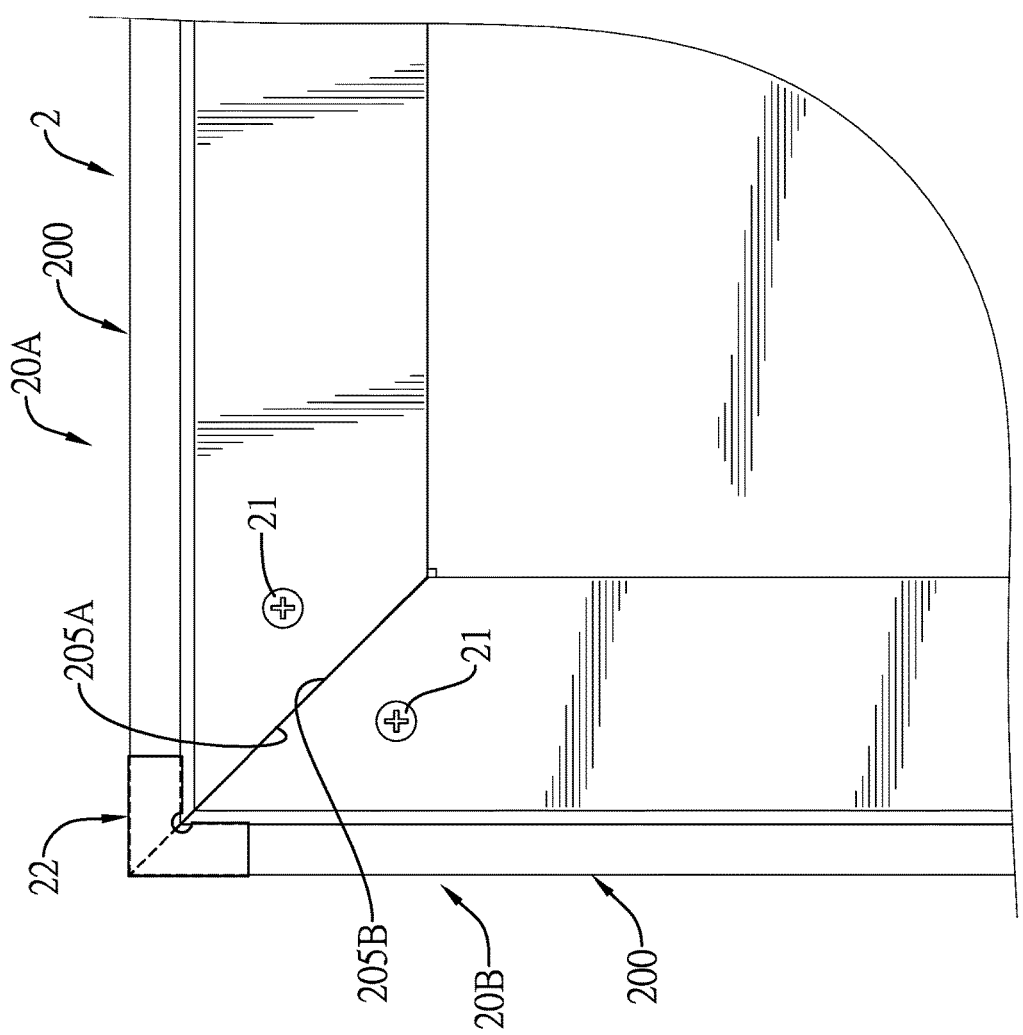
FIG. 13 is an enlarged rear view of the holding frame assembly in FIG. 1.
Figure 16:
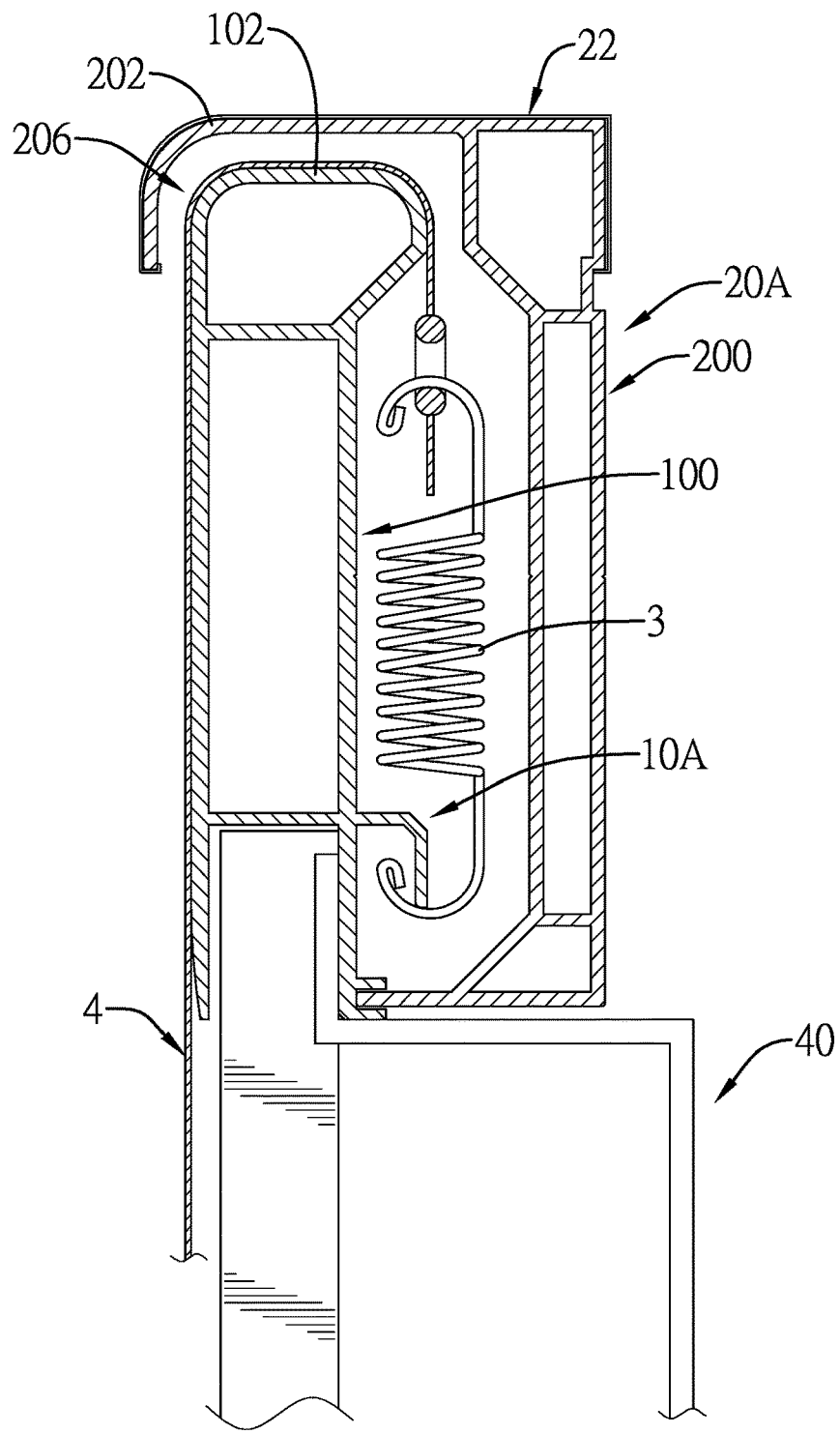
FIG. 16 is an enlarged side view in partial section of the holding frame assembly in FIG. 1 with an L-shaped corner protector.
Figure 17:
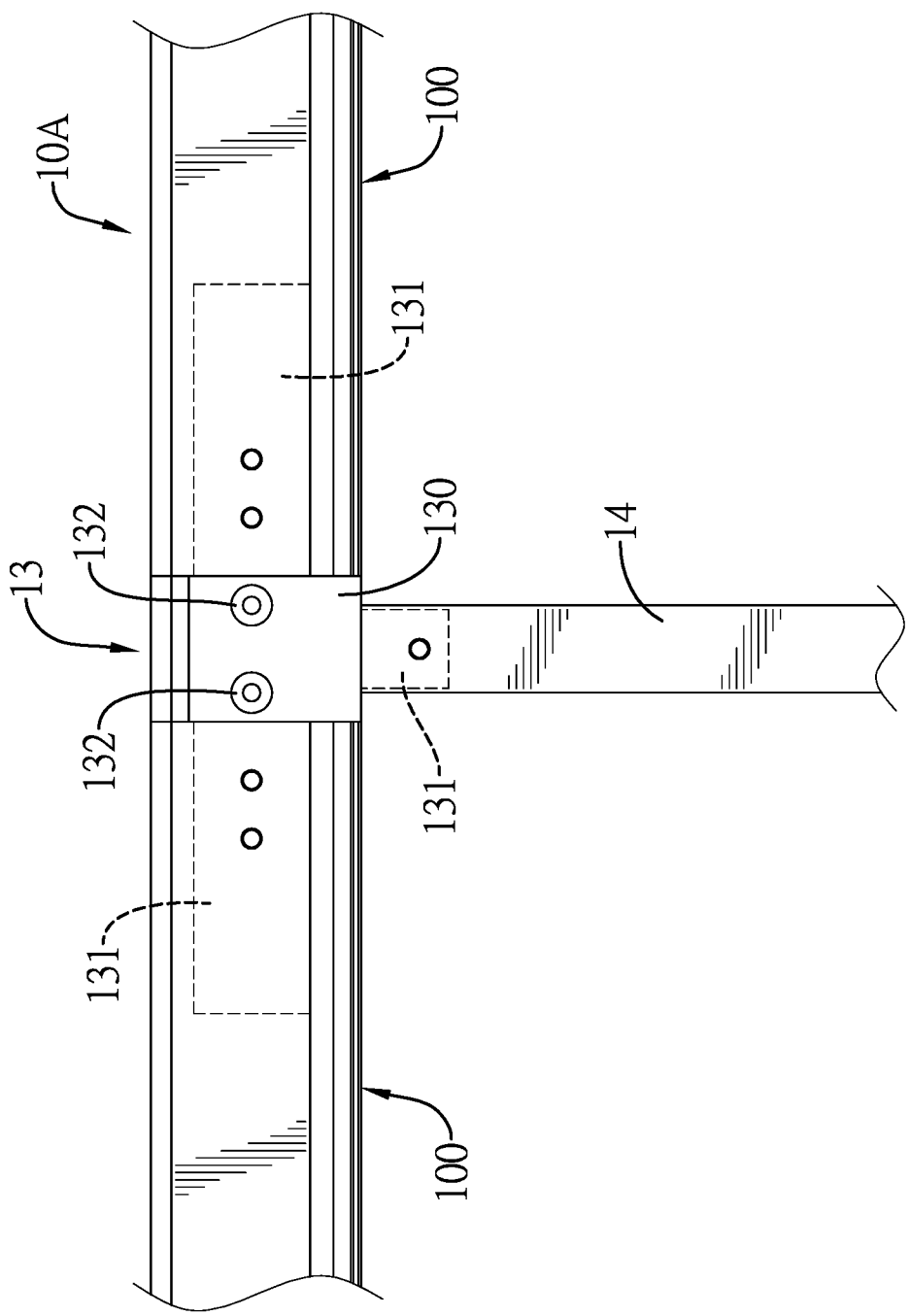
FIG. 17 is an enlarged rear view of the holding frame assembly in FIG. 1.
Figure 18:
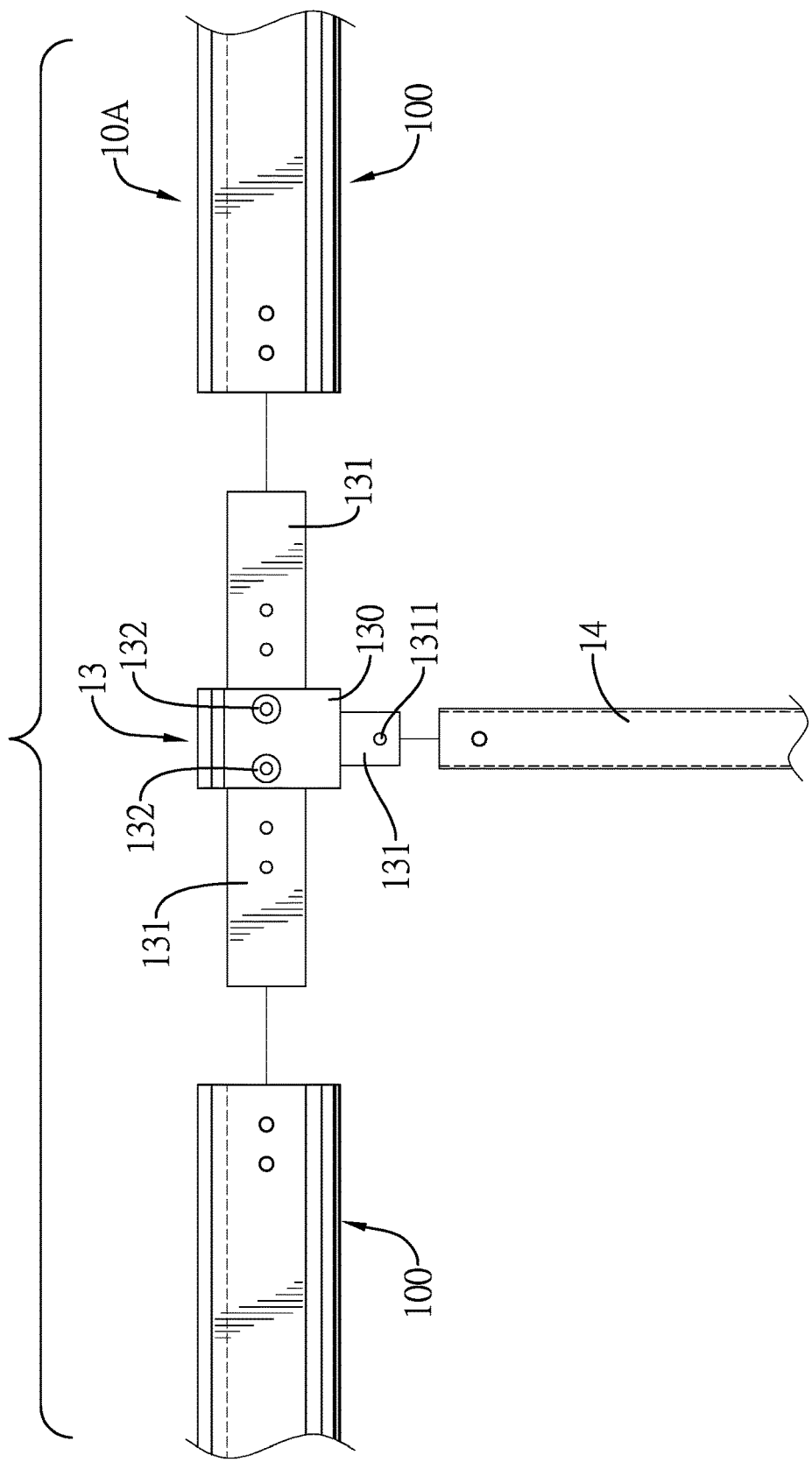
FIG. 18 is an exploded rear view of the holding frame assembly in FIG. 17.
Figure 19:
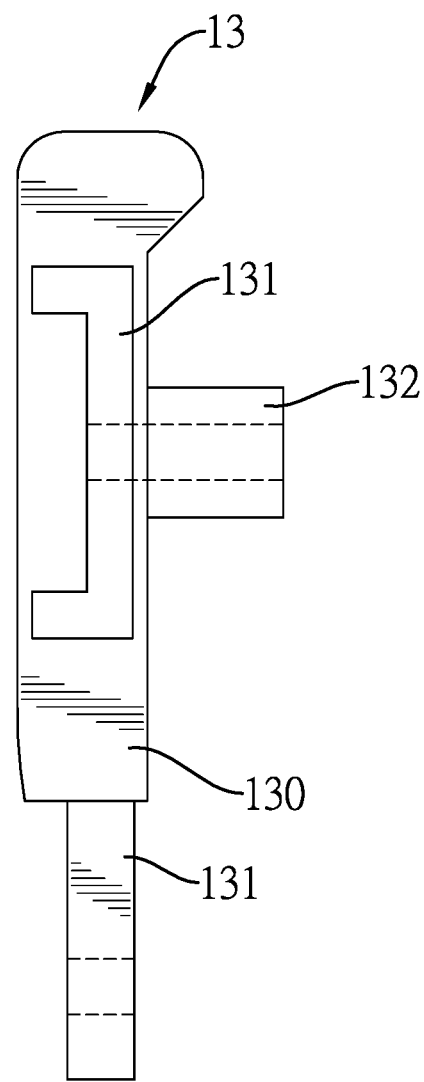
FIG. 19 is an enlarged side view of a T-shaped connecting member of the holding frame assembly in FIG. 18.
Figure 20:
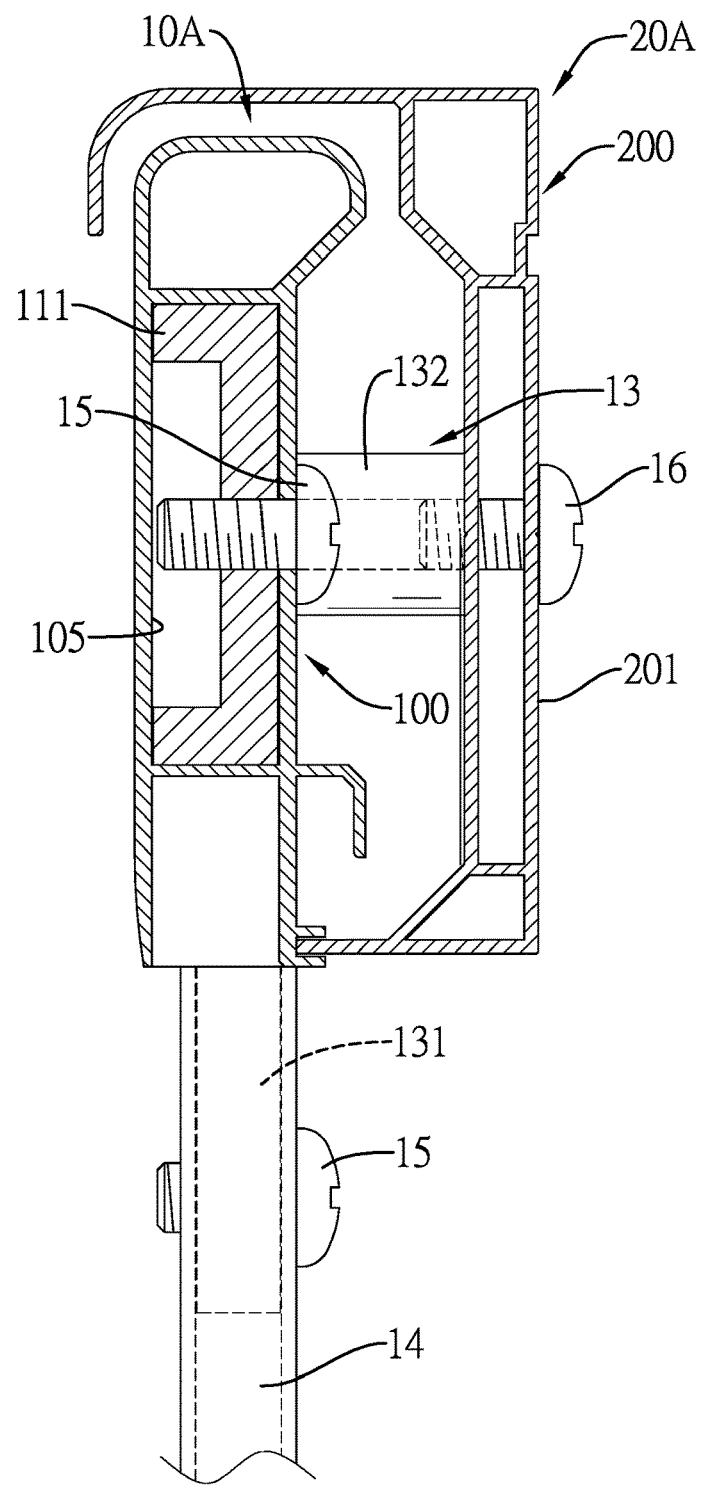
FIG. 20 is an enlarged side view in partial section of the holding frame assembly in FIG. 1.

With reference to FIGS. 13 and 16, the outer frame 2 may further comprise four L-shaped corner protectors 22 mounted respectively on four corners of the outer frame 2 and holds the ends 205A, 205B of the two lateral outer frame rods 20A and the two longitudinal outer frame rods 20B inside the corner protectors 22. Accordingly, the sharped ends 205A, 205B and gaps between the ends 205A, 205B can be enclosed in the corner protectors 22, and the shaped ends 205A, 205B are kept from being exposed.

Figure 11:
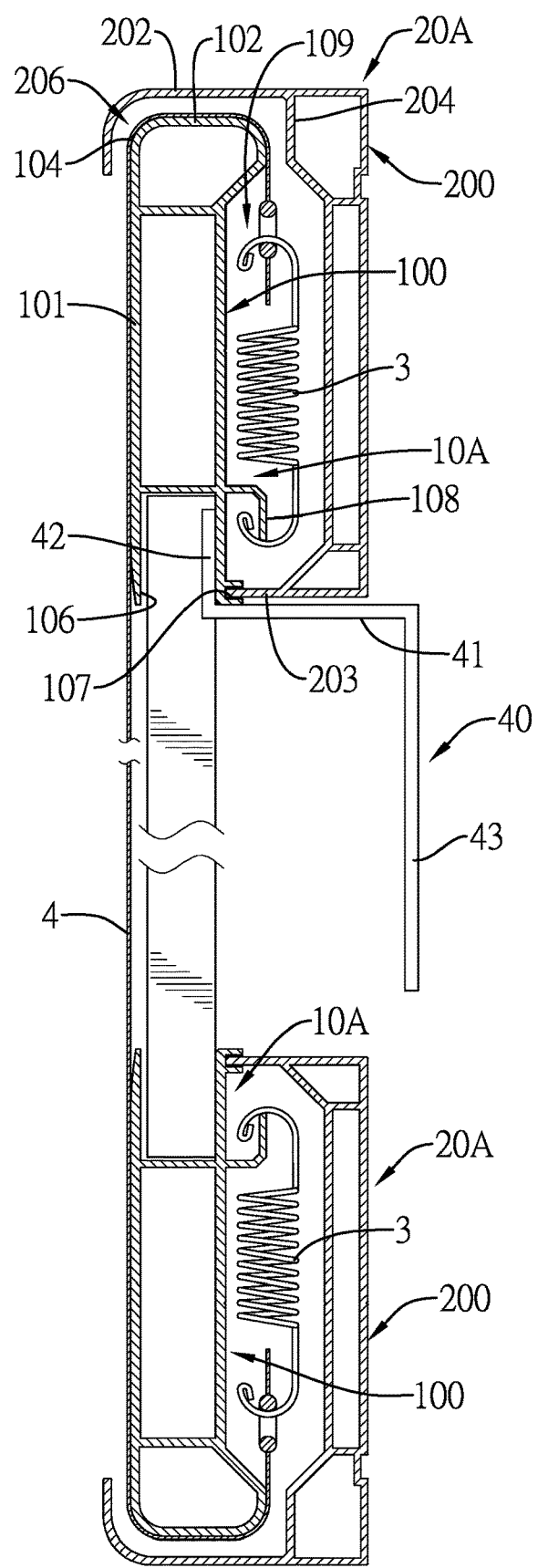
FIG. 11 is an enlarged side view in partial section of the holding frame assembly in FIG. 1.
Figure 12:
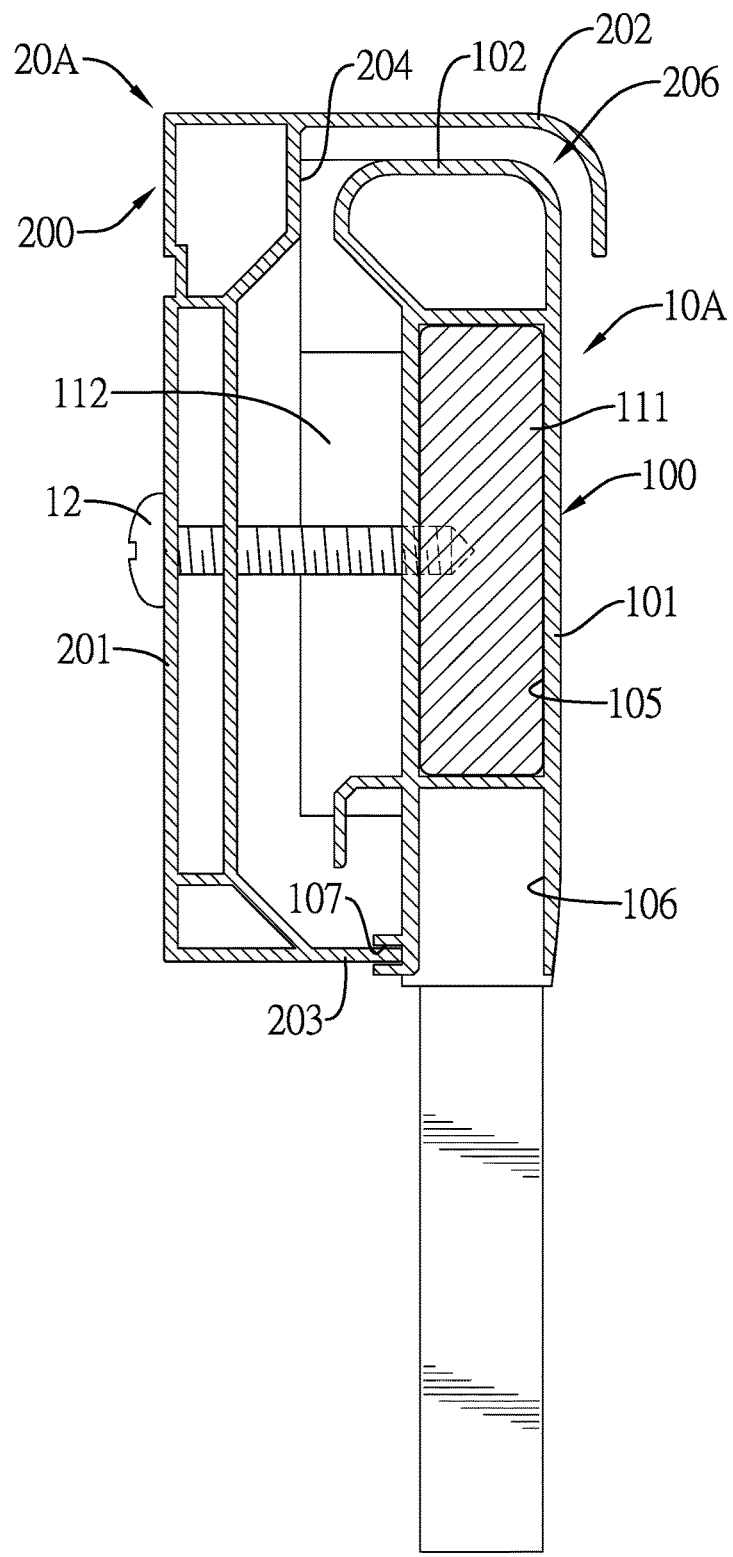
FIG. 12 is another enlarged side view in partial section of the holding frame assembly in FIG. 1.

With reference to FIGS. 1, 3, and 11, the elastic members 3 are mounted between and are hidden in the main rod bodies 101 of the main frame 1 and the outer rod bodies 201 of the outer frame 2. Preferably, each elastic member 3 may be a spring or a resilient strip. The elastic members 3 are held in the holding spaces 109 of the main frame 1. One end of each elastic member 3 is connected with the connecting hook 108 of a corresponding one of the main frame rods 10A, 10B, and the other end of each elastic member 3 is connected with one of the side edges of the projection screen 4.

With reference to FIGS. 1 and 2, one or two of the main frame rods 10A, 10B may be composed of multiple main rod elements 100 and at least one T-shaped connecting member 13. Multiple supporting rods 14 are respectively connected between corresponding T-shaped connecting elements 13 of the main frame rods 10A, 10B. Accordingly, the structural strength of the main frame 1 can be enhanced, and the main frame 1 can be held in a rectangular shape securely.

With reference to FIG. 1, in the first embodiment, each lateral main frame rod 10A is composed of two main rod elements 100 and a T-shaped connecting member 13. A supporting rod 14 is mounted between the T-shaped connecting members 13 of the two lateral main frame rods 10A. With reference to FIG. 2, in the second embodiment, each lateral main frame rod 10A is composed of three main rod elements 100 and two T-shaped connecting members 13. Two supporting rods 14 are mounted between the T-shaped connecting members 13 of the two lateral main frame rods 10A. When the main frame rods 10A, 10B are composed of multiple main rod elements 100 and at least one T-shaped connecting member 13, the outer frame rods 20A, 20B of the outer frame 2 are also composed of multiple outer rod elements 200 connected in series and the outer rod elements 200 are connected with the T-shaped connecting members by bolts 16.

With reference to FIGS. 1 and 17 to 19, each T-shaped connecting member 13 comprises a main body 130 and three arms 131. The main body 130 is rectangular in shape and has four side edges. The arms 131 are respectively formed on and extend from three of the four side edges of the main body 130, and each arm 131 has at least one fastening hole 1311. The three arms 131 include two opposite side arms 131 and a middle arm 131. The opposite side arms 131 are inserted respectively into the connection holes 105 of two of the main rod elements 100 connected with the T-shaped connecting element 13. Multiple securing bolts 15 are mounted through the main rod elements 100 and are screwed into the fastening holes 1311 of the opposite side arms 131 of the T-shaped connecting members 13 to connect the T-shaped connecting members 13 with the corresponding main rod elements 100. The middle arm 131 is inserted into a corresponding one of the supporting rods 14, a securing bolt 15 is mounted through the corresponding supporting rod 14 and is screwed into the fastening hole 1311 in the middle arm 131. In addition, two supporting protrusions 132 are formed on and protrude from a rear side of the main body 130. Each supporting protrusion 132 has a threaded hole. The bolts 16 are mounted through the outer rod elements 200 of the outer frame rods 20A, 20B and are screwed into the threaded holes in the supporting protrusions 132 to connect the outer frame rods 20A, 20B with the T-shaped connecting elements 13. The supporting protrusions 132 can provide a supporting effect to the outer frame rods 20A, 20B.

The holding frame assembly in accordance with the present invention can be detached into multiple components, and the components can be packaged and transported in a small size. Therefore, the transportation and storage of the holding frame assembly is convenient.

Figure 15:
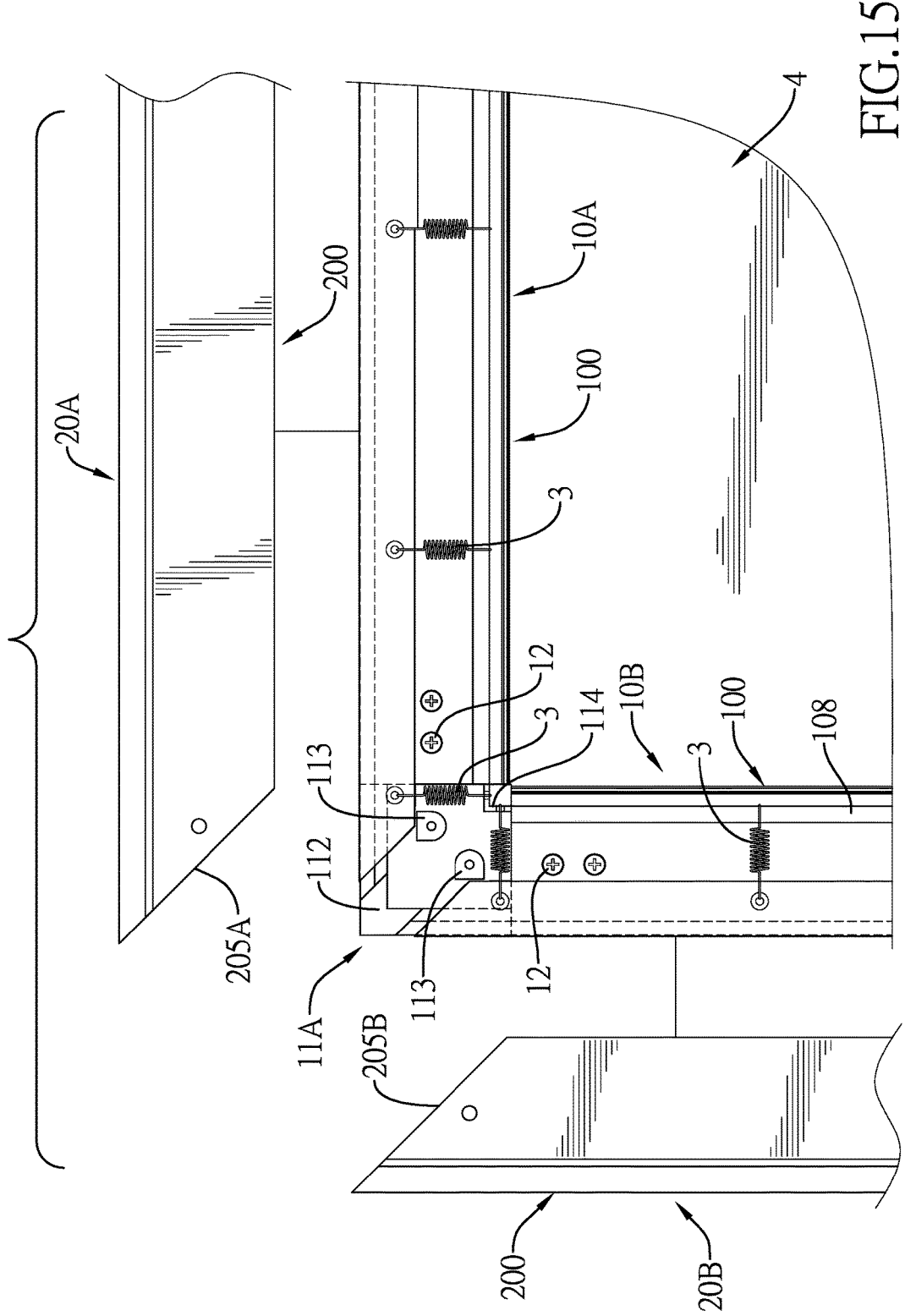
FIG. 15 is an enlarged exploded rear view of the holding frame assembly with the L-shaped connection element in FIG. 8.

With reference to FIGS. 1, 3, and 16, when the holding frame assembly is in use, a projection screen 4 is covered onto a front side of the main frame 1 and the side edges of the projection screen 4 are curved along the curved surfaces 104 of the outer side edges 102 of the main frame rods 10A, 10B. With reference to FIG. 15, the side edges of the projection screens 4 can be aligned with the alignment lines 115 and the inclined lines 116 on the L-shaped connection elements 11A. With reference to FIGS. 3, 14, and 15, the elastic members 3 connected with the side edges of the projection screen 4 are connected with the connecting hooks 108 of the main frame 1 and the spring mount 114 of the L-shaped connection elements 11A. Accordingly, the projection screen 4 can be fully expanded on the main frame 1 by the elastic tension provided by the elastic members 3.

In addition, the connection boards 203 of the outer frame rods 20A, 20B can be inserted into the connection grooves 107 in the main frame rods 10A, 10B in advance. The outer frame rods 20A, 20B are then securely connected with the base segments of the L-shaped connection elements 11 by the outer frame fasteners 21. Therefore, the combination of the outer frame 2 with the main frame 1 is convenient.

Figure 21:
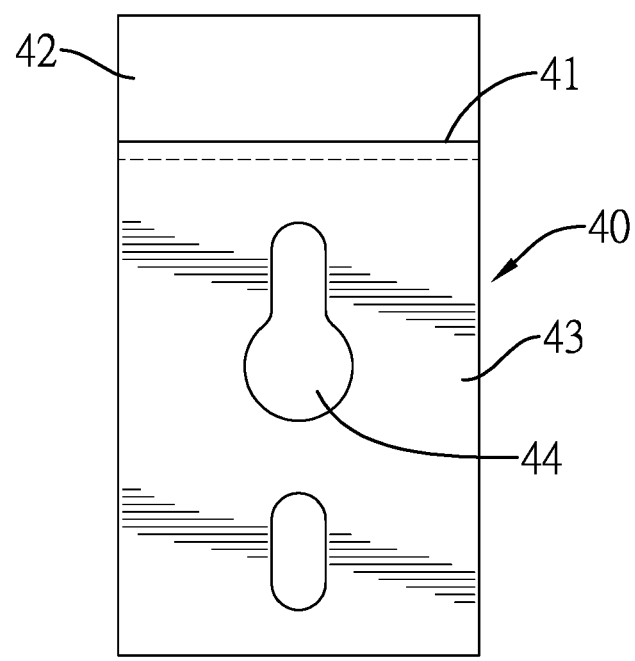
FIG. 21 is an enlarged front view of the supporting member of the holding frame assembly in FIG. 11.

With reference to FIGS. 11 and 21, the holding frame assembly may further comprise multiple supporting members 40. Each supporting member 40 comprises a main segment 41, an abutment segment 42, and a securing segment 43. The abutment segment 42 is formed on and extends upward from one of the two opposite side edges of the main segment 41, extends into the opening 106 of a corresponding main rod element 100 and abuts an inner surface of the main rod body 101 of the corresponding main rod element 100. The securing segment 43 is formed on and extends downward from the other side edge of the main segment 41 opposite the abutment segment 42 and has multiple securing through holes 44. Multiple bolts are mounted through the securing through holes 44 in the supporting members and are securely connected with a wall or a supporting frame, such that the holding frame assembly can be securely mounted on the wall or the supporting frame.

The holding frame assembly in accordance with the present invention can expand a soft projection screen 4 fully on the holding frame assembly. In addition, the holding frame assembly has an enhanced structural strength and is not easily deformed. Furthermore, with the arrangement of the decorative boards having curved front ends, the holding frame has a slim frame structure, so the appearance of the holding frame assembly is neat and aesthetically appealing.

Additionally, the holding frame assembly has a gap 206 to allow the projection screen 4 to pass through the gap 206. With the connection between the frame rods 10A, 10B of the main frame 1 and the L-shaped connection element 11 and the attachment between the frame rods 20A, 20B of the outer frame 2 and the L-shaped connection elements 11, the frame rods 10A, 10B, 20A, 20B do not compress against the projection screen 4 and the projection screen 4 will not be damaged by the main frame 1 and the outer frame 2. The elastic members 3 can provide sufficient tension to the projection screen 4 to expand the projection screen 4 completely and smoothly. The elastic members 3 are hidden between the main frame 1 and the outer frame 2, so the aesthetic appeal of the holding frame assembly is enhanced.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A projection screen holding frame assembly comprising:
    a main frame being rectangular in shape and comprising
        two lateral main frame rods and two longitudinal main frame rods connected with the two lateral main frame rods to hold a projection screen on the main frame in an expansion state;
        four L-shaped connection elements disposed respectively at four connected portions of the two lateral main frame rods and the two longitudinal main frame rods to connect the two lateral main frame rods and the two longitudinal main frame rods; and
        multiple main frame securing fasteners connected securely with the L-shaped connection elements, the two lateral main frame rods, and the two longitudinal main frame rods;
    an outer frame mounted around the main frame by multiple outer frame fasteners and composed of two lateral outer frame rods and two longitudinal outer frame rods, wherein the two lateral outer frame rods are fixed respectively to the two lateral main frame rods and outer surfaces of corresponding two of the L-shaped connection elements and the two longitudinal outer frame rods are fixed respectively to the two longitudinal main frame rods and outer surfaces of corresponding two of the L-shaped connection elements;
    a gap defined between the outer frame and the main frame to allow the projection screen to pass through the gap; and
    multiple elastic members disposed between the main frame and the outer frame and connected with the main frame to connect with a periphery of the projection screen.

2. The projection screen holding frame assembly as claimed in claim 1, wherein
    each one of the two lateral main frame rods and the two longitudinal main frame rods of the main frame comprises at least one main rod element;
    each one of the at least one main rod element of each one of the two lateral main frame rods and the two longitudinal main frame rods comprises
        a main rod body having
            an inner side edge; and
            an outer side edge being curved in shape and protruding from a rear side of the main rod body;
        a connection hole defined in the main rod body;
        a holding space defined in the rear side of the main rod body; and
        a connection groove defined in the rear side of the main rod body at a position adjacent to the inner side edge;
    the elastic members are held in the holding spaces of the main rod bodies of the main rod elements of the two lateral main frame rods and the two longitudinal main frame rods;
    each L-shaped connection element comprises
        a base segment being square in shape and having an inner corner and an outer corner defined respectively at two ends of a diagonal line of the base segment;
        two connection arms connected respectively with two side edges of the base segment adjacent to the inner corner and inserted respectively into the connection holes in the main rod bodies of the main rod elements of two of the main frame rods connected with the L-shaped connection element;
        a supporting segment formed on and protruding from a rear side of the base segment and extending from the outer corner toward the inner corner of the base segment;
    each one of the two lateral outer frame rods and the two longitudinal outer frame rods of the outer frame has two ends respectively having an inclined end edge at an angle of 45° and comprises at least one outer rod element;
    each one of the at least one outer rod element of the two lateral outer frame rods and the two longitudinal outer frame rods comprises
        an outer rod body having two side edges;
        a decorative board formed on and protruding from a front side of the outer rod body at one of the two side edges of the outer rod body and having a curved front end opposite the outer rod body;
        a connection board formed on and protruding from the front side of the outer rod body at the other side edge of the outer rod body opposite the decorative board and inserted into the connection groove in a corresponding one of the main rod elements of the two lateral main frame rods and the two longitudinal main frame rods; and
        an abutment segment formed on and protruding from the front side of the outer rod body at a position adjacent to the decorative board;
    the supporting segment of each L-shaped connection element abuts ends of two of the outer rod elements of the two lateral outer frame rods and the two longitudinal outer frame rods;
    the outer frame fasteners are connected with the ends of the outer rod elements of the two lateral outer frame rods and the two longitudinal outer frame rods and the L-shaped connection elements; and
    the gap is defined between the decorative boards of the outer rod elements of the two lateral outer frame rods and the two longitudinal outer frame rods and the outer side edges of the main rod elements of the two lateral main frame rods and the two longitudinal main frame rods.

3. The projection screen holding frame assembly as claimed in claim 2, wherein each one of the two lateral main frame rods and the two longitudinal main frame rods includes multiple main rod elements and at least one T-shaped connecting member disposed between the main rod elements of the main frame rod to connect the main rod elements together; and multiple supporting rods are respectively connected between corresponding T-shaped connecting elements of the two lateral main frame rods and the two longitudinal main frame rods.

4. The projection screen holding frame assembly as claimed in claim 3, wherein each one of the at least one T-shaped connecting element of each one of the two lateral main frame rods and the two longitudinal main frame rods comprises a main body being rectangular in shape and having four side edges and two supporting protrusions formed on a rear side of the main body, wherein each supporting protrusion has a connecting hole connected with a bolt that is mounted through a corresponding one of the main rod elements connected with the T-shape connecting element; and three arms respectively formed on and extending from three of the four side edges of the main body, including two opposite side arms and a middle arm, and each having at least one fastening hole, wherein the two opposite side arms are inserted respectively into the connection holes of two of the main rod elements connected with the T-shaped connecting element; and the middle arm is connected with the supporting rod connected with the T-shaped connecting element.

5. The projection screen holding frame assembly as claimed in claim 4, wherein the outer frame further comprises four L-shaped corner protectors mounted respectively on four corners of the outer frame and holds the ends having the inclined end edges of the two lateral outer frame rods and the two longitudinal outer frame rods of the outer frame inside the corner protectors.

6. The projection screen holding frame assembly as claimed in claim 5, wherein each of the elastic members is a spring; and the main frame further comprises multiple connecting hooks mounted on the main rod elements of the two lateral main frame rods and the two longitudinal main frame rods of the main frame and connected respectively with the elastic members.

7. The projection screen holding frame assembly as claimed in claim 6 further comprising multiple supporting members connected with the two lateral main frame rods of the main frame, and each supporting member comprising a main segment having two opposite side edges;

an abutment segment formed on and extending upward from one of the two opposite side edges of the main segment, extending into an opening defined in the inner side edge of a corresponding one of the at least one main rod element of a corresponding one of the two lateral main frame rods, and abutting an inner surface of the main rod body of the corresponding main rod element; and a securing segment formed on and extending downward from the other side edges of the main segment opposite the abutment segment and having multiple securing through holes.

8. The projection screen holding frame assembly as claimed in claim 4, wherein each L-shaped connection element further has two abutment protrusions formed on the rear side of the base segment of the L-shaped connection element, abutting respectively on ends of corresponding two of the two lateral outer frame rods and the two longitudinal outer frame rods of the outer frame, and each abutment protrusion having a threaded hole.

9. The projection screen holding frame assembly as claimed in claim 8, wherein each elastic member is a spring;

the main frame further comprises multiple connecting hooks mounted on the main rod elements of the two lateral main frame rods and the two longitudinal main frame rods of the main frame and connected respectively with the elastic members;

each L-shaped connection element further has a spring mount formed on the rear side of the base segment of the L-shaped connection element and having two spring holes connected respectively with two of the elastic members.

10. The projection screen holding frame assembly as claimed in claim 9, wherein each L-shaped connecting element further has an alignment line formed on the rear side of the base segment of the L-shaped connection element and being perpendicular to one of the side edges of the base segment adjacent to the alignment line; and an inclined line formed on the rear side of the base segment of the L-shaped connection element and being inclined at an angle of 45° relative to one of the side edges of the base segment adjacent to the inclined line.

11. The projection screen holding frame assembly as claimed in claim 4 further comprising multiple supporting members connected with the two lateral main frame rods of the main frame, and each supporting member comprising a main segment having two opposite side edges;

an abutment segment formed on and extending upward from one of the two opposite side edges of the main segment, extending into an opening defined in the main rod body of a corresponding one of the at least one main rod element of a corresponding one of the two lateral main frame rods, and abutting an inner surface of the main rod body of the corresponding main rod element; and a securing segment formed on and extending downward from the other side edges of the main segment opposite the abutment segment and having multiple securing through holes.

12. The projection screen holding frame assembly as claimed in claim 4, wherein each elastic member is a spring; and the main frame further comprises multiple connecting hooks mounted on the main rod elements of the two lateral main frame rods and the two longitudinal main frame rods of the main frame and connected respectively with the elastic members.

13. The projection screen holding frame assembly as claimed in claim 12 further comprising multiple supporting members connected with the two lateral main frame rods of the main frame, and each supporting member comprising a main segment having two opposite side edges;

an abutment segment formed on and extending upward from one of the two opposite side edges of the main segment, extending into an opening defined in the main rod body of a corresponding one of the at least one main rod element of a corresponding one of the two lateral main frame rods, and abutting an inner surface of the main rod body of the corresponding main rod element; and a securing segment formed on and extending downward from the other side edges of the main segment opposite the abutment segment and having multiple securing through holes.

14. The projection screen holding frame assembly as claimed in claim 2, wherein
   each elastic member is a spring; and
   the main frame further comprises multiple connecting hooks mounted on the main rod elements of the two lateral main frame rods and the two longitudinal main frame rods of the main frame and connected respectively with the elastic members.

15. The projection screen holding frame assembly as claimed in claim 14 further comprising multiple supporting members connected with the two lateral main frame rods of the main frame, and each supporting member comprising
   a main segment having two opposite side edges;
   an abutment segment formed on and extending upward from one of the two opposite side edges of the main segment, extending into an opening defined in the main rod body of a corresponding one of the at least one main rod element of a corresponding one of the two lateral main frame rods, and abutting an inner surface of the main rod body of the corresponding main rod element; and
   a securing segment formed on and extending downward from the other side edges of the main segment opposite the abutment segment and having multiple securing through holes.

16. The projection screen holding frame assembly as claimed in claim 2, wherein each L-shaped connection element further has two abutment protrusions formed on the rear side of the base segment of the L-shaped connection element, abutting respectively on ends of corresponding two of the two lateral outer frame rods and the two longitudinal outer frame rods of the outer frame, and each having a threaded hole.

17. The projection screen holding frame assembly as claimed in claim 16, wherein
   each elastic member is a spring;
   the main frame further comprises multiple connecting hooks mounted on the main rod elements of the two lateral main frame rods and the two longitudinal main frame rods of the main frame and connected respectively with the elastic members; and
   each L-shaped connection element further has a spring mount formed on the rear side of the base segment of the L-shaped connection element and having two spring holes connected respectively two of the elastic members.

18. The projection screen holding frame assembly as claimed in claim 17, wherein
   each L-shaped connecting element further has
      an alignment line formed on the rear side of the base segment of the L-shaped connection element and being perpendicular to one of the side edges of the base segment adjacent to the alignment line; and
      an inclined line formed on the rear side of the base segment of the L-shaped connection element and being inclined at an angle of 45° relative to one of the side edges of the base segment adjacent to the inclined line.

19. The projection screen holding frame assembly as claimed in claim 2 further comprising multiple supporting members connected with the two lateral main frame rods of the main frame, and each supporting member comprising
   a main segment having two opposite side edges;
   an abutment segment formed on and extending upward from one of the two opposite side edges of the main segment, extending into an opening defined in the main rod body of a corresponding one of the at least one main rod element of a corresponding one of the two lateral main frame rods, and abutting an inner surface of the main rod body of the corresponding main rod element; and
   a securing segment formed on and extending downward from the other side edges of the main segment opposite the abutment segment and having multiple securing through holes.

* * * * *